US012337854B2

(12) United States Patent
Roger et al.

(10) Patent No.: US 12,337,854 B2
(45) Date of Patent: *Jun. 24, 2025

(54) ELECTRONIC CONTROL UNIT, GATEWAY CIRCUIT FOR AN AIRBAG ELECTRONIC CONTROL UNIT, SAFETY SYSTEM FOR A VEHICLE, AND ENVIRONMENTAL SENSOR ELEMENT

(71) Applicant: Infineon Technologies AG, Neubiberg (DE)

(72) Inventors: Andre Roger, Munich (DE); Farhan Bin Khalid, Munich (DE); Romain Ygnace, Brunnthal (DE)

(73) Assignee: Infineon Technologies AG, Neubiberg (DE)

( * ) Notice: Subject to any disclaimer, the term of this patent is extended or adjusted under 35 U.S.C. 154(b) by 354 days.

This patent is subject to a terminal disclaimer.

(21) Appl. No.: 17/822,957

(22) Filed: Aug. 29, 2022

(65) Prior Publication Data
US 2022/0410912 A1    Dec. 29, 2022

Related U.S. Application Data

(63) Continuation of application No. 16/041,031, filed on Jul. 20, 2018, now Pat. No. 11,433,910.

(30) Foreign Application Priority Data

Jul. 20, 2017   (DE) .......................... 102017116411.1

(51) Int. Cl.
*B60W 50/00* (2006.01)

(52) U.S. Cl.
CPC ... *B60W 50/0098* (2013.01); *B60W 2420/408* (2024.01); *B60W 2554/00* (2020.02)

(58) Field of Classification Search
CPC .......... B60W 60/001; B60W 2554/80; B60W 2554/404; B60W 2552/53;
(Continued)

(56) References Cited

U.S. PATENT DOCUMENTS 5,573,269 A * 11/1996 Gentry .............. B60R 21/01516
177/144
5,583,771 A * 12/1996 Lynch ................. B60R 21/0132
180/282
(Continued)

FOREIGN PATENT DOCUMENTS

CN    103204121 A    7/2013
CN    106456062 A    2/2017
(Continued)

OTHER PUBLICATIONS

Hijazi, Samer et al., "Using Convolutional Neural Networks for Image Recognition," Cadence, www.cadence.com, Sep. 2015, 12 pages.
(Continued)

*Primary Examiner* — Mussa A Shaawat
(74) *Attorney, Agent, or Firm* — Slater Matsil, LLP

(57) ABSTRACT

An electronic control unit includes a signal input circuit configured to receive a sensor signal from a radar sensor or from a lidar sensor and a processing circuit configured to determine a first condition based on a first representation of the sensor signal, and to generate an activation signal in response to the first condition.

20 Claims, 5 Drawing Sheets

(58) Field of Classification Search
CPC ....... B60W 60/0015; B60W 2554/402; B60W 2554/4041; B60W 2554/4042; B60W 2556/25; B60W 40/02; B60W 2420/403; G06V 20/58

See application file for complete search history.

(56) References Cited

U.S. PATENT DOCUMENTS

| | | | | |
|---|---|---|---|---|
| 5,629,847 | A * | 5/1997 | Shirakawa | B60R 21/0133 340/436 |
| 5,809,437 | A * | 9/1998 | Breed | B60N 2/0276 73/114.61 |
| 6,484,080 | B2 * | 11/2002 | Breed | B60N 2/2863 701/30.6 |
| 7,527,288 | B2 * | 5/2009 | Breed | B60R 21/0132 280/735 |
| 2005/0107933 | A1 * | 5/2005 | Kuroda | B60R 21/0133 701/45 |
| 2005/0257985 | A1 | 11/2005 | Fukushima et al. | |
| 2006/0092004 | A1 * | 5/2006 | Klotz | G01S 7/481 340/435 |
| 2013/0215314 | A1 * | 8/2013 | Prentice | H04N 23/72 348/362 |
| 2015/0151694 | A1 * | 6/2015 | Kornhaas | H04L 12/40189 701/1 |
| 2017/0120804 | A1 * | 5/2017 | Kentley | B60R 21/01 |
| 2017/0120902 | A1 * | 5/2017 | Kentley | B60W 10/18 |
| 2017/0293025 | A1 * | 10/2017 | Davis | G01S 7/0233 |
| 2018/0172729 | A1 | 6/2018 | Kirst | |
| 2018/0275658 | A1 * | 9/2018 | Iandola | G06F 30/20 |
| 2018/0356497 | A1 * | 12/2018 | Roger | G01S 7/2806 |
| 2018/0365988 | A1 * | 12/2018 | Eilertsen | G08G 1/0112 |
| 2019/0085037 | A1 * | 3/2019 | Abad | C07K 14/325 |
| 2019/0213875 | A1 * | 7/2019 | Eilertsen | G08G 1/0145 |
| 2019/0270780 | A1 * | 9/2019 | Abad | A01N 63/23 |
| 2019/0311154 | A1 * | 10/2019 | Eu | G06F 21/72 |
| 2022/0270409 | A1 * | 8/2022 | Kramer | G01C 21/3644 |

FOREIGN PATENT DOCUMENTS

| | | |
|---|---|---|
| DE | 3811217 C2 | 10/1989 |
| DE | 19845568 A1 | 10/1999 |
| DE | 10325163 A1 | 12/2004 |
| DE | 102008046488 A1 | 3/2010 |
| DE | 102008043637 A1 | 5/2010 |
| DE | 102010003297 A1 | 9/2011 |
| DE | 102010022706 A1 | 12/2011 |
| DE | 102010029780 A1 | 12/2011 |
| DE | 102012210106 A1 | 12/2013 |
| DE | 102011119963 A1 | 4/2014 |
| DE | 102015014817 A1 | 5/2016 |
| DE | 102015200926 A1 | 7/2016 |
| DE | 102016209704 A1 | 12/2017 |

OTHER PUBLICATIONS

Patole, Sujeet et al., "Automotive Radars—A review of signal processing techniques," Signal Processing for Smart Vehicle Technologies: Part 2, IEEE Signal Processing Magazine, Mar. 2017, pp. 22-35.

Schneider, Martin "Automotive Radar—Status and Trends," Robert Bosch GmbH, In Proceedings of the German Microwave Conference GeMiC, Apr. 2005, pp. 144-147.

* cited by examiner

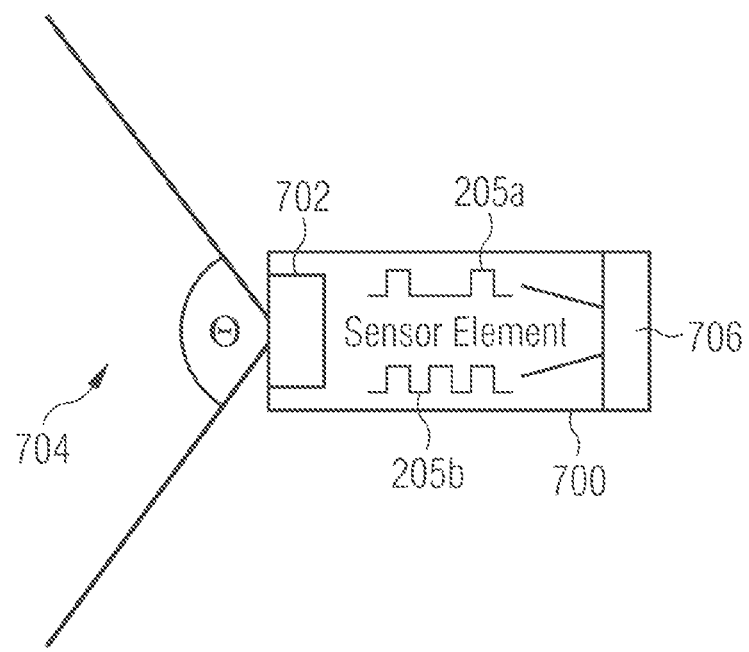

ELECTRONIC CONTROL UNIT, GATEWAY CIRCUIT FOR AN AIRBAG ELECTRONIC CONTROL UNIT, SAFETY SYSTEM FOR A VEHICLE, AND ENVIRONMENTAL SENSOR ELEMENT

This application is a continuation of U.S. patent application Ser. No. 16/041,031, filed Jul. 20, 2018, which application claims the benefit of German Application No. 10 2017 116 411.1, filed on Jul. 20, 2017, which applications are hereby incorporated herein by reference in its entirety.

TECHNICAL FIELD

Embodiments relate to an electronic control unit, gateway circuits couplable to an airbag electronic control unit and to a safety system for a vehicle using environmental sensors.

BACKGROUND

Vehicles, such as automobiles or trucks, often comprise impact sensors to determine, whether the vehicle hit an object or whether an object hit the vehicle and to subsequently cause safety measures to protect the people within the vehicle, e.g. by causing the firing of one or more airbags. The commonly-used sensors, for example pressure sensors in a pressure chamber or inertial sensors are sensitive to the impact itself, i.e. they provide a sensor response once an impact had already occurred. In other words, the condition that causes the safety measures is the impact itself. The electronic control unit (ECU) used to evaluate the sensor signal is required to evaluate the sensor signals with a very low latency in order to cause the safety measures in time so that the safety measures are not executed too late, to still protect the passengers within the vehicle. Due to the very low latency, evaluation algorithms of the sensor signals are often required to be simple in order to assure timely execution. Therefore, the decision to take any safety measures or the safety measures chosen may be suboptimal due to the limited processing time available. Further, the choice of safety measures to be taken may be limited, if an impact is only detectable once it had occurred. Some measures increasing the passenger's safety can eventually not be taken since their execution takes too long to be effective after the impact had already occurred. Hence, there appears to be room for improvement of the conventional systems.

SUMMARY

In accordance with an embodiment, an electronic control unit includes a signal input circuit configured to receive a sensor signal from a radar sensor or from a lidar Sensor and a processing circuit configured to determine a first condition based on a first representation of the sensor signal, and to generate an activation signal in response to the first condition.

In accordance with another embodiment, a safety system for a vehicle includes a first environmental sensor configured to provide first sensor signals; a second environmental sensor configured to provide second sensor signals, wherein the first sensor signal and the second sensor signal are loosely coupled and a field of view for the first environmental sensor and the second environmental sensor are at least partially overlapping; a first gateway circuit comprising a first signal output configured to generate a first representation of the first sensor signal, and a second signal output configured to forward a second representation of the first sensor signal to a physical layer of a communication system; a second gateway circuit comprising a first signal output configured to generate a first representation of the second sensor signal, and a second signal output configured to forward a second representation of the second sensor signal to the physical layer of the communication system; and an airbag electronic control unit configured to identify a first condition based on the first representation of the first sensor signal, the first representation of the second sensor signal, or a combination of the first representation of the first sensor signal and the first representation of the second sensor signal, wherein the airbag electronic control unit is further configured to generate an activation signal in response to the first condition.

In accordance with a further embodiment, an environmental sensor element for a vehicle includes a radar sensor or a lidar sensor configured to produce a sensor signal covering a field of view; wherein the environmental sensor element is configured to provide a first representation of the sensor signal; wherein the environmental sensor element is further configured to provide a second representation of the sensor signal; and wherein an interface of the environmental sensor element couplable to a physical layer of a communication system, the interface is further configured to output the first representation of the sensor signal, the second representation of the sensor signal, or both the first representation of the sensor signal and the second representation of the sensor signal to the physical layer.

BRIEF DESCRIPTION OF THE DRAWINGS

Some embodiments of apparatuses and/or methods will be described in the following by way of embodiment only, and with reference to the accompanying figures, in which

FIG. 8 schematically illustrates an embodiment of an environmental sensor element.

Figure 1:
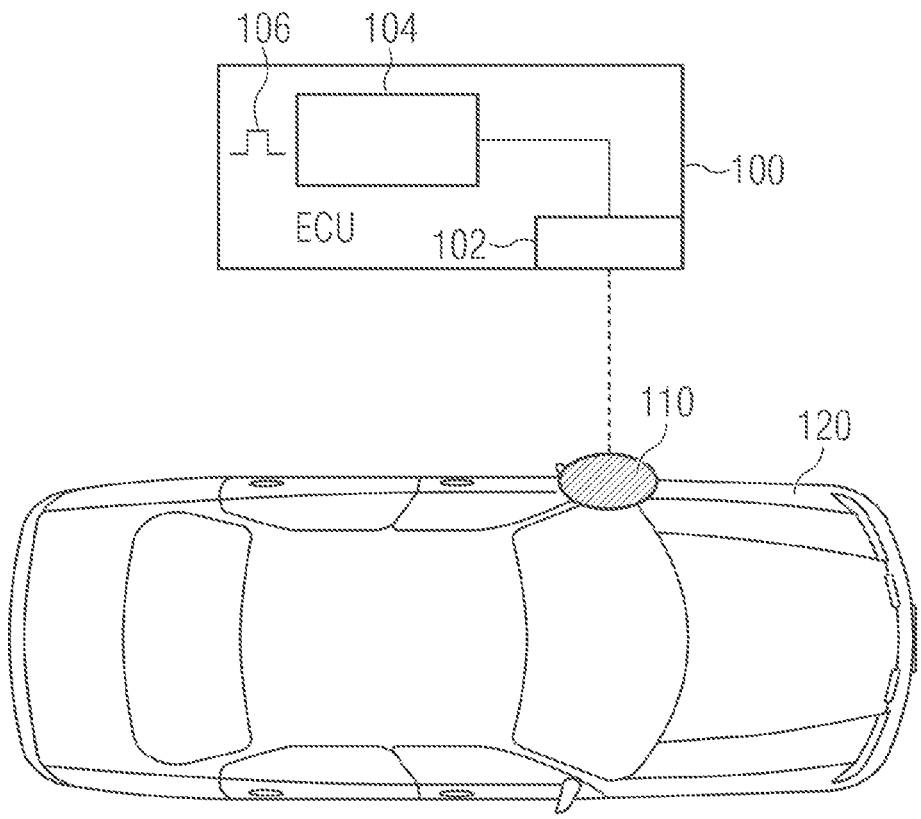
FIG. 1 illustrates an embodiment of an Electronic control unit configured to process a sensor signal.

Corresponding numerals and symbols in different figures generally refer to corresponding parts unless otherwise indicated. The figures are drawn to clearly illustrate the relevant aspects of the preferred embodiments and are not necessarily drawn to scale. To more clearly illustrate certain embodiments, a letter indicating variations of the same structure, material, or process step may follow a figure number.

DETAILED DESCRIPTION OF ILLUSTRATIVE EMBODIMENTS

Some embodiments of an electronic control unit comprise a signal input circuit configured to receive a sensor signal from a radar (radio detection and ranging) sensor or from a lidar (light detection and ranging) sensor as well as a processing circuit configured to determine a first condition based on a first representation of the sensor signal. The processing circuit generates an activation signal in response to the first condition. An electronic control unit (ECU) capable of receiving sensor signals from radar sensors or lidar sensors may be able to determine an upcoming impact before it actually occurs.

Radar sensors or lidar sensors provide information on an environment of the vehicle, so that an impact may be determined or predicted—before it actually happens. Therefore, there is time to determine the first condition from a first representation of the sensor signal. It will be appreciated that with an impact sensor of the prior art, such determination of a first condition prior to an impact is not possible.

If the first condition is met an activation signal may be issued. The activation signal may cause the safety measures required for a particular expected impact, in order to either prevent the expected impact or at least mitigate its consequences.

The time available prior to an expected or estimated impact may also be used to cause safety measures other than those conventionally available. With the first condition identified prior to impact, also safety measures requiring more time for execution are now within the scope of the application. According to some embodiments, the activation signal may not only cause the activation of an irreversible safety measure, like the firing of an airbag, but also the activation of a reversible safety measure. A reversible safety measure may have a longer execution time at the benefit of the possibility of reversing the safety measure or stopping the safety measure during its execution. That is, an embodiment of an electronic control unit may be capable of deciding, depending on the first condition, whether to generate a reversible activating signal for activating a reversible safety measure or to generate an irreversible activating signal for activating an irreversible safety measure. Having the capability to cause a reversible safety measure, irreversible safety measures, or a combination of both, may not only increase the safety of the vehicle's passengers but also save on costs, for example, if reversible safety measures not requiring subsequent repair of the car are sufficient to protect the passengers according to the first condition determined.

For example, if an upcoming impact with low speed or with a soft object is determined as the first condition, it may be sufficient to tension a seatbelt of a vehicle's passenger as opposed to take the irreversible safety measure of firing an airbag.

According to some embodiments, the reversible activating signal can be configured to cause at least one of the closing of at least one window of a vehicle and the closing of at least one roof portion of the vehicle to avoid intrusion of objects into the interior of the vehicle. Other reversible safety measures include the tensioning of at least one seatbelt of the vehicle or adjusting of at least one seat of the vehicle in order to bring a passenger of the vehicle in a position in which an impact or a strong deceleration force to the body of the passenger causes minimum possible damage.

According to further embodiments, the reversible activating signal may cause a suppression of an emergency braking of a vehicle for a certain amount of time, although a deceleration of the vehicle appears to mitigate the damages of an upcoming impact. Having knowledge on an environment of a vehicle, the ECU may be enabled to determine a first condition in which the overall threat to the passengers of the vehicle may be minimized, if one particular impact scenario can be avoided by suppressing an emergency braking even if that decision comes at the cost of accepting a higher speed for another impact scenario.

In particular, different deformation characteristics of vehicles may also be considered during the decision making. For example, side impacts hit the cabin of the vehicle at a position where there is minor or no room for deformation before there is direct impact on a passenger. In contrast thereto for a front impact, there is more room for deformation of the cabin of the vehicle before there is direct impact on a passenger. Therefore, if the ECU determines an upcoming side impact as well as an upcoming front impact thereafter as the first condition, suppressing the emergency braking long enough may be appropriate. Suppressing the emergency braking may allow the vehicle to leave an area where the upcoming side impact is to occur may significantly increase the passenger's safety. The overall threat to the passengers may in fact be decreased, even if the velocity at which the front impact subsequently occurs, may be higher as compared to a conventional scenario with instant emergency braking.

Further or additional to the reversible activating signal causing reversible safety measures, the activation signal may be an irreversible activating signal causing at least one of an emergency braking of a vehicle, and a firing of an airbag.

Sensor signals of radar sensors or lidar sensors may be available with a high resolution, for example to support autonomous drive functions. For example, a sensor signal generated by radar or lidar sensors may be capable of identifying objects with high spatial resolution and with high spectral resolution to distinguish also minor position and velocity differences. If, for example, the sensor signal is also used for autonomous drive systems or advanced drivers assistance (ADAS) systems both relying on a reconstruction of the environment of the vehicle with sufficient resolution in order to take the appropriate driving decisions, high resolution sensor signals may already be available within a system of a vehicle so configured. The sensor signals may be present with high resolution to be able to decide, for example, what steering action is required to avoid touching or hitting an object. Likewise (high resolution) sensor signals may be used in order to avoid leaving the road. While such autonomous or assisted driving decisions may be less time critical, the decision as to whether an activation signal is to be generated by the electronic control unit to cause a safety measure may need to be taken with a much lower latency. Some embodiments of electronic control units are, therefore, optionally further configured to generate the first representation of the sensor signal which may enable appropriate and time-sensitive processing within the processing circuit itself, based on the sensor signal available from the radar sensor and/or the lidar sensor.

According to some embodiments, the first representation of the sensor signal may be derived from a second representation of the sensor signal which is received from an environmental sensor. According to some embodiments, the first representation of the sensor signal may be derived with a lower resolution than a second representation of the sensor signal.

According to further embodiments, the processing circuit of the electronic control unit may be capable of also generating the second representation of the sensor signal from the received sensor signal and to forward the second representation to a first output interface of the electronic control unit, which is couplable to a physical layer of a communication system. The electronic control unit may thus be enabled to achieve fast decision making while further components using the sensor signal may operate on a second representation of the sensor signal, which may, for example, have a higher resolution. An electronic control unit according to an embodiment may hence by integrated in existing systems already having further components operating on the second representation of the sensor signal without the necessity to modify the existing components, sensors, or both.

According to some embodiments, the processing circuit of the electronic control unit is configured to extract the first representation from the second representation received within the sensor signal. This enables the electronic control unit to use a sensor signal appropriately set up for further components within the vehicle, while being enabled to operate with the required latency since it is capable of extracting and thus generating the required first representation of the sensor signal itself. The ECU and its functionality may also be included without effort and high additional costs into already existing communication system, e.g. into an autonomous driving system.

According to some embodiments, the second representation of the sensor signal has a higher resolution than the first representation of the sensor signal. While further components within the vehicle, such as for example autonomous driving control units may have the capability of using the second representation with a higher resolution, the electronic control unit may use the first representation with the lower resolution so as to enable the electronic control unit to the required fast decision making. For example, according to some embodiments, the resolution of the first representation of the sensor signal is, for a given instant of sensor data, lower in terms of at least one of an angular resolution (one of an azimuthal or an elevational resolution, or both), a spatial range covered, or a relative velocity.

While some embodiments of electronic control units may be configured to generate a first representation of the sensor signal and a second representation of the sensor signal within its processing circuit, further embodiments are implemented as a gateway circuit which is couplable to an airbag electronic control unit. The gateway circuit enables the use of an airbag electronic control unit together with environmental sensors, such as for example with a radar sensor or lidar sensor. To this end, embodiments of a gateway circuit couplable to an airbag electronic control unit comprise a signal input configured to receive a sensor signal from an environmental sensor of a vehicle and a first signal output configured to forward a first representation of the sensor signal of the environmental sensor to the ECU. The gateway circuit further comprises a second signal output configured to forward a second representation of the sensor signal of the environmental sensor to a physical layer of a communication system for further use of other components within the vehicle or otherwise attached to the communication system.

Using a gateway circuit according to an embodiment may enable deliberately combining airbag electronic control units together with existing further electronic control units, such as for example an autonomous drive electronic control unit, which may require the second representation of the sensor signal in order to be able to operate as desired.

According to some embodiments, the gateway circuit is capable of identifying whether a received sensor telegram comprises the first representation of the sensor signal or the second representation of the sensor signal based on a tag within an individual sensor telegram. This may allow for an efficient hardware implementation of the gateway circuit in systems where the sensor signal is created having a series of sensor telegrams. It is then sufficient for the gateway circuit to be capable of identifying the tags within the sensor telegram to appropriately direct the content of the sensor telegram to the first signal output or to the second signal output, respectively. According to some embodiments, the gateway circuit is configured to provide the second representation of the sensor signal according to a protocol usable within the communication system so as to forward the second representation to further associated processing entities connected to the gateway by means of the communication system.

Further embodiments of a gateway circuit serve as a gateway for multiple associated environmental sensors, so that the gateway circuit further comprises a second signal input configured to receive a further sensor signal from a second environmental sensor of the vehicle. Further, the first signal output of the gateway circuit is configured to forward the first representation of the further sensor signal to the airbag ECU. Similarly, the second signal output is configured to forward the second representation of the further sensor signal to the physical layer of the communication system.

According to some embodiments, an environmental sensor element for a vehicle capable of cooperating together with an ECU comprises a radar or lidar sensor configured to produce a sensor signal covering a field of view. The sensor element is configured to provide a first representation of the sensor signal as well as a second representation of the sensor signal. The environmental sensor further comprises an interface couplable to a physical layer of a communication system. The interface is configured to output the first representation of the sensor signal, the second representation of the sensor signal, or both the first the representation of the sensor signal and the second representation of the sensor signal to the physical layer in order to provide different representations of the sensor signal for an ECU as well as for other components or ECUs within the system. If the environmental sensor element has an interface that is configured to output the different representations of the sensor signals using one or more or sensor telegrams, the different representations may be transported via a common communication channel. In order to enable the subsequent components to identify the different representations without a high analysis effort, some embodiments of environmental sensor elements insert a specific tag into individual sensor telegrams, the tag indicating whether the individual sensor telegram is part of the first representation of the sensor signal or of the second representation of the sensor signal.

Some embodiments of a safety system for a vehicle comprise a first environmental sensor providing first sensor signals, a second environmental sensor providing second sensor signals, the second environmental sensor being loosely coupled to the first environmental sensor, while a field of view of the first environmental sensor and the second environmental sensor are at least partially overlapping. Within the system, a gateway circuit comprises a first signal output configured to generate a first representation of the first sensor signal and a second signal output configured to forward a second representation of the first sensor signal to a physical layer of a communication system. Likewise, a second gateway circuit comprises a first signal output configured to generate a first representation of the second sensor signal at the second signal output configured to forward a second representation of the second sensor signal to the physical layer of the communication system. The safety system further comprises an airbag ECU configured to identify a first condition based on the first representation of the first sensor signal, the first representation of the second sensor signal, or a combination of the first representation of the first sensor signal and the first representation of the second sensor signal. The airbag ECU is configured to generate an activation signal in response to the first condition. The activation signal is configured to cause the execution of safety measures.

Using at least two environmental sensors within the safety system, the environmental sensors that exhibit an at least partially overlapping field of view may allow determining information on an observed object that indicates an overall likelihood or the time of an impact of the observed object to the vehicle. For example, the combination of the first representation of the first sensor signal and the first representation of the second sensor signal may provide an estimate for a direction of movement of an object within the partially overlapping fields of view. For example, a first condition that indicates a future impact may be identified if the moving object is identified in only one of the first representation of the first sensor signal and the second representation of the second sensor signal after the object was detectable within the first representation of the first sensor signal and the first representation of the second sensor signal. If, under these circumstances, an object can no longer be identified within a field of view of one of the sensors, one can conclude, that the object has at least a component of relative movement in a direction perpendicular to an axis connecting the positions of the environmental sensors. If, for example, the environmental sensors are placed at a side of a vehicle, one can conclude that the moving object is moving towards the side of the vehicle and a condition of an upcoming side impact can be determined.

Various embodiments will now be described more fully with reference to the accompanying drawings in which some embodiments are illustrated. In the figures, the thicknesses of lines, layers and/or regions may be exaggerated for clarity.

Accordingly, while further embodiments are capable of various modifications and alternative forms, some particular embodiments thereof are shown in the figures and will subsequently be described in detail. However, this detailed description does not limit further embodiments to the particular forms described. Further embodiments may cover all modifications, equivalents, and alternatives falling within the scope of the disclosure. Like numbers refer to like or similar elements throughout the description of the figures, which may be implemented identically or in modified form when compared to one another while providing for the same or a similar functionality.

It will be understood that when an element is referred to as being "connected" or "coupled" to another element, the elements may be directly connected or coupled or via one or more intervening elements. If two elements A and B are combined using an "or", this is to be understood to disclose all possible combinations, i.e. only A, only B as well as A and B. An alternative wording for the same combinations is "at least one of A and B". The same applies for combinations of more than two Elements.

The terminology used herein for the purpose of describing particular embodiments is not intended to be limiting for further embodiments. Whenever a singular form such as "a," "an" and "the" is used and using only a single element is neither explicitly or implicitly defined as being mandatory, further embodiments may also use plural elements to implement the same functionality. Likewise, when a functionality is subsequently described as being implemented using multiple elements, further embodiments may implement the same functionality using a single element or processing entity. It will be further understood that the terms "comprises," "comprising," "includes" and/or "including," when used, specify the presence of the stated features, integers, steps, operations, processes, acts, elements and/or components, but do not preclude the presence or addition of one or more other features, integers, steps, operations, processes, acts, elements, components and/or any group thereof.

FIG. 1 schematically illustrates an embodiment of an Electronic control unit 100. The Electronic control unit 100 comprises a signal input circuit 102 configured to receive a sensor signal from a radar sensor or from a Lidar Sensor used as environmental sensor no within a safety system for a vehicle 120. The vehicle 120 and the environmental sensor no are shown for illustrative purposes only. The signal input circuit 102 may be connectable to arbitrary communication media enabling the receipt of sensor signals and support any protocol usable with the communication medium of the particular implementation. For example, the sensor signal may be received as a series of individual sensor telegrams at the signal circuit 102. The sensor signal may be received using arbitrary communication protocols, e.g. using a sensor specific communication protocols like one of Single Edge Nibble Transmission (SENT) or Short PWM Code (SPC). Other examples for usable protocols are Bus Protocols like Controller Area Network (CAN), FlexRay, Local Interconnect Network (LIN), or Ethernet.

The Electronic control unit 100 further comprises a processing circuit 104. The processing circuit 104 determines a first condition based on a first representation of the sensor signal and generates an activation signal 106 in response to the first condition. The first representation of the sensor signal may be chosen or created to fit the processing capabilities of the processing circuit 104 and the time available to determine the first condition the processing circuit is searching for.

It will be appreciated that radar sensors or lidar sensors provide information on an environment of the vehicle so that an impact may be determined or predicted before it actually happens, providing at least the additional time budget between the occurrence of the first condition and the expected impact. In fact, the expected impact may even be prevented, depending on circumstances.

The additional time budget may also be used to cause safety measures other than those conventionally available, like firing of an airbag or causing an emergency braking, since also safety measures that require more time for execution are now within the scope of the application. According to some embodiments, the activation signal 106 may not only cause the activation of an irreversible safety measure, like firing an airbag or causing an emergency braking, but also the activation of a reversible safety measure. Embodiments of an electronic control unit 100 may be capable of deciding, depending on the first condition, whether to generate a reversible activating signal for activating a reversible safety measure or to generate an irreversible activating signal for activating an irreversible safety measure.

Examples of reversible safety measures are (without being exhaustive) closing at least one window of a vehicle, closing at least one roof portion of the vehicle, tensioning at least one seat belt of the vehicle, adjusting at least one seat of the vehicle, or suppressing an emergency breaking of a vehicle, as shall be explained further down in more detail.

A particular attractive way to determine the first condition is the use of a neuronal network. Properly trained neuronal networks have the capability to perform complex analyses with low latency and high reliability. Hence, even multiple sensor signals from radar or lidar sensors may be analyzed within an embodiment of an Electronic control unit with the required low latency if a neuronal network is used within the processing circuit 104.

In a vehicle having autonomous driving or ADAS functionalities, multiple environmental sensors like radar sensors, lidar sensors, or camera sensors may already be present. Typically, these environmental sensor signals are processed by the ADAS system with larger resources than conventional ECUs used for say, an airbag system. Therefore, the environmental sensors may provide the sensor signals in a representation which cannot be appropriately processed by the Electronic control unit 100. For example, a second representation of the sensor signals provided within those systems may have a higher resolution than the resolution possible for the first representation of the sensor signals. However, embodiments of airbag ECUs provide or generate the first representation of the sensor signals with a lower resolution so that the airbag ECU is enabled to also process data of existing environmental sensors. Adding an embodiment of an Electronic control unit 100 to an existing system, therefore, requires no changes of the environmental sensors and of further existing ECUs. Adding an embodiment of an airbag ECU may also allow changing the existing components or their software without requiring a subsequent modification of the added airbag ECU since the generation of the lower resolution representation within the airbag ECU is independent from the existent components. This may be of particular interest since modifications of an airbag ECU or its software would come at the cost of a subsequent validation process in which it is to be proven that the software of the airbag ECU is fault-free.

Figure 2:
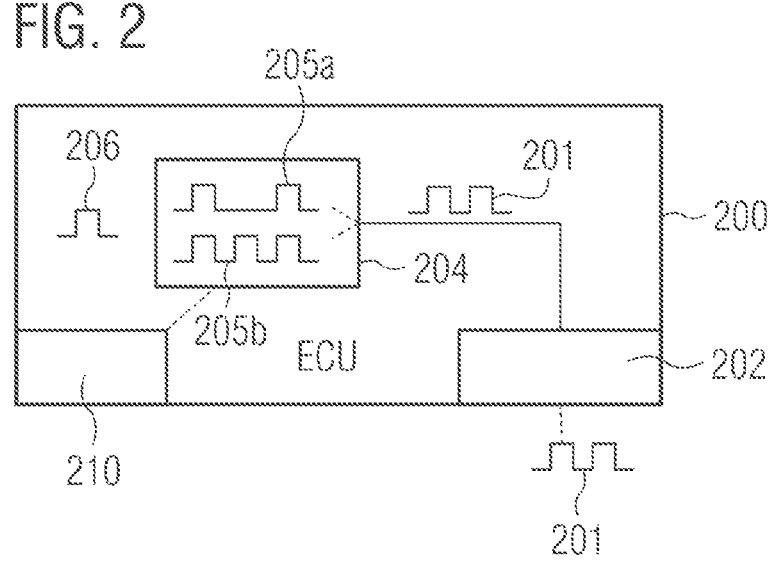
FIG. 2 illustrates a further embodiment of an Electronic control unit configured to process at least two representations of sensor signals.

FIG. 2 illustrates an embodiment of an Electronic Control Unit 200 that may be included without hardly any changes to, e.g., an existing autonomous drive system. The Electronic Control Unit 200 is enabled to additionally process the sensor signals of already existing environmental sensors. Similar to the embodiment of FIG. 1, the Electronic Control Unit 200 comprises a signal input circuit 202 configured to receive a sensor signal 201 from a radar sensor or from a Lidar sensor as well as a processing circuit 204 to determine a first condition using a first representation of the sensor signal 205a—also referred to as first sensor signal representation 205a or first representation 205a. The processing circuit 204 is further configured to generate an activation signal 206 in response to the first condition. Further to the embodiment of FIG. 1, the processing circuit 204 is also configured to generate a second representation of the sensor signal 205b—also referred to as second sensor signal representation 205b or second representation 205b. The processing circuit 204 is further configured to forward the second representation of the sensor signal 205b to a first output interface 210 which is couplable to a physical layer of a communication system.

If, for example, the Electronic Control Unit 200 supports the protocol used within an autonomous drive system at both, its signal input circuit 202 and its first output interface 210, the Electronic Control Unit 200 may be inserted between an autonomous drive ECU and its associated environmental sensors to also make use of the environmental sensor signals for causing safety measures without requiring a further adaption of the autonomous drive system. To this end the first output interface 210 may support arbitrary protocols, such as for example CAN, FlexRay, or Ethernet.

An Electronic Control Unit 200 of further embodiments may be capable of receiving sensor signals from two or more environmental sensors. In such an implementation, the input circuit 202 is configured to receive at least one further sensor signal from a second environmental sensor of the vehicle. Likewise, the first output interface 210 is then further configured to forward at least a first representation of the further sensor signal.

In some applications, the second representation of the sensor signal 205b for the autonomous drive ECU may require a higher resolution than the first representation of the sensor signal 205a for the Electronic Control Unit 200 so that the processing circuit 204 is required to reduce the resolution of the second representation of the sensor signal 205b or to extract the first representation of the sensor signal 205a from the second representation of the sensor signal 205b.

A particular example as to how a reduction of resolution may be achieved with low computational effort is illustrated subsequently while referring to the representation of data provided by radar or lidar sensors as their sensor signal in FIG. 3. The radar data cube 300 illustrated in FIG. 3 as one particular example for a sensor signal generated by means of a single sensor has three dimensions. The first dimension 302 is indicative of the distance of an object causing a reflection of the radar signal sent by the radar sensor. The second dimension 304 is indicative of the receive channel of the sensor, which typically comprises an array of receive antennas, each receive antenna corresponding to one receive channel. The third dimension 306 indicates the relative velocity between the sensor and an object reflecting a radar signal. Each of the three dimensional cubes illustrated in FIG. 3 has associated therewith a coefficient showing signal power or a complex value of the signal describes the strength of an echo of the radar signal associated to the parameter set represented by the bin in the first, second, and third dimension 302, 304, 306.

For a continuous wave radar system, for example, the distance of the reflection is determined by a frequency difference between the radar signal presently transmitted and the reflected radar signal presently received. If the signal strength per frequency difference is evaluated by means of a Fourier analysis, the strength of the reflection is proportional to the Fourier coefficient found for the frequency difference. Therefore, the order of the coefficient comprises information on the distance, while the magnitude of the coefficient provides information on the size of the reflecting object. The information on the relative velocity between the reflecting object and the sensor is additionally determined by evaluating a Doppler shift of the reflected signal relative to the transmitted signal. In such an implementation, the coefficients associated to the individual bins may be proportional to the magnitude of the determined Fourier coefficients.

The resolution of the sensor signal or the radar cube 300 is given by the grid in all three dimensions 302, 304, and 306. A goal of reducing the resolution of the first representation of the sensor signal 205a is to reduce the amount of data the Electronic Control Unit has to deal with to enable fast processing given the limited computational power of the ECU.

Assuming that the radar cube 300 is provided as the second representation of the sensor signal, the resolution of the representation can be decreased in various ways and with respect to various characteristics to arrive at a first representation having a lower resolution.

For decreasing the resolution of the distance, two or more neighboring bins may be merged in the first dimension 302. Further, if one is only interested in finding a condition that is indicative of an impact of an object to the vehicle, distances above a certain minimum distance may be disregarded without disadvantage, in turn resulting in a reduction of data to be further processed within the processing circuit 204.

The resolution of the relative velocity may, for example, be reduced by merging two or more neighboring bins in the third dimension 306. Similar to disregarding reflections above a certain distance, entries corresponding to a relative movement away from the sensor may be completely disregarded for the purpose of collision prediction, which may also result in a significant amount of data reduction.

The resolution may further be decreased with respect to the radar cross section of the objects receiving an entry within the radar data cube. For continuous wave radar, this can be achieved by increasing the threshold for the Fourier coefficients to be considered within the radar data cube. For the purpose of collision detection and generation of appropriate safety measures, restricting the analysis to objects above a certain size may be sufficient and advantageous in terms of processing complexity.

Figure 3:
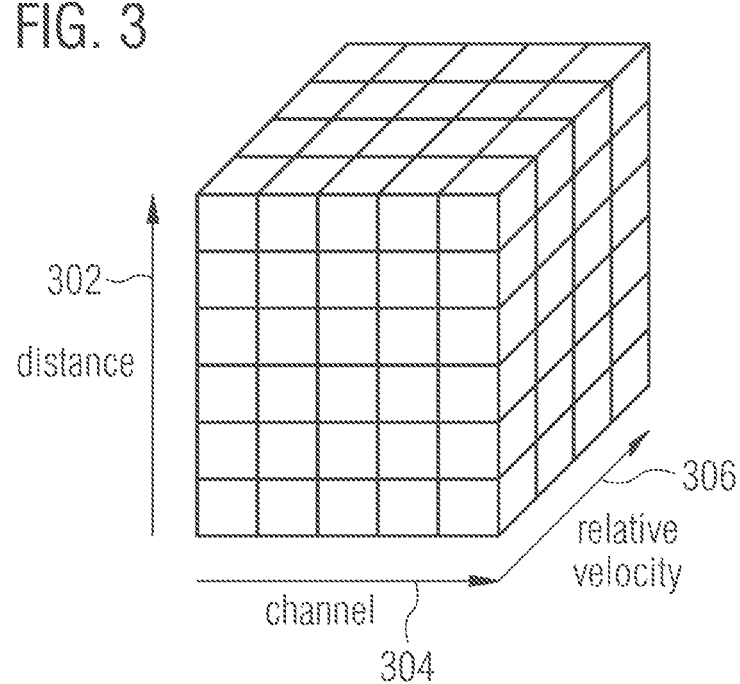
FIG. 3 illustrates an embodiment for a representation of a sensor signal as provided by an environmental radar sensor array.

Based on the radar data cube in FIG. 3, the spatial and angular resolution may also be decreased by merging two or more neighboring bins in the second dimension 304.

As elaborated on previously, the second representation of the sensor signal 205b may have a higher resolution than required for the first representation of the sensor signal 205a for a given instant of sensor data (which is, e.g., represented by a single radio data cube in FIG. 3) in terms of at least one of angular resolution, spatial range covered, and relative velocity. Of course, the resolution may also be reduced with respect to more of these aspects at a time. Using one or a combination of several of the previously described examples of data reduction, an algorithm may be implemented to reduce the amount of data of a given radar data cube with regard to one or more of the dimensions illustrated in FIG. 3. The so generated low-resolution representation of the radar data cube may subsequently be processed within an Electrical Control Unit having limited processing power, such as for example within an airbag ECU.

Figure 4:
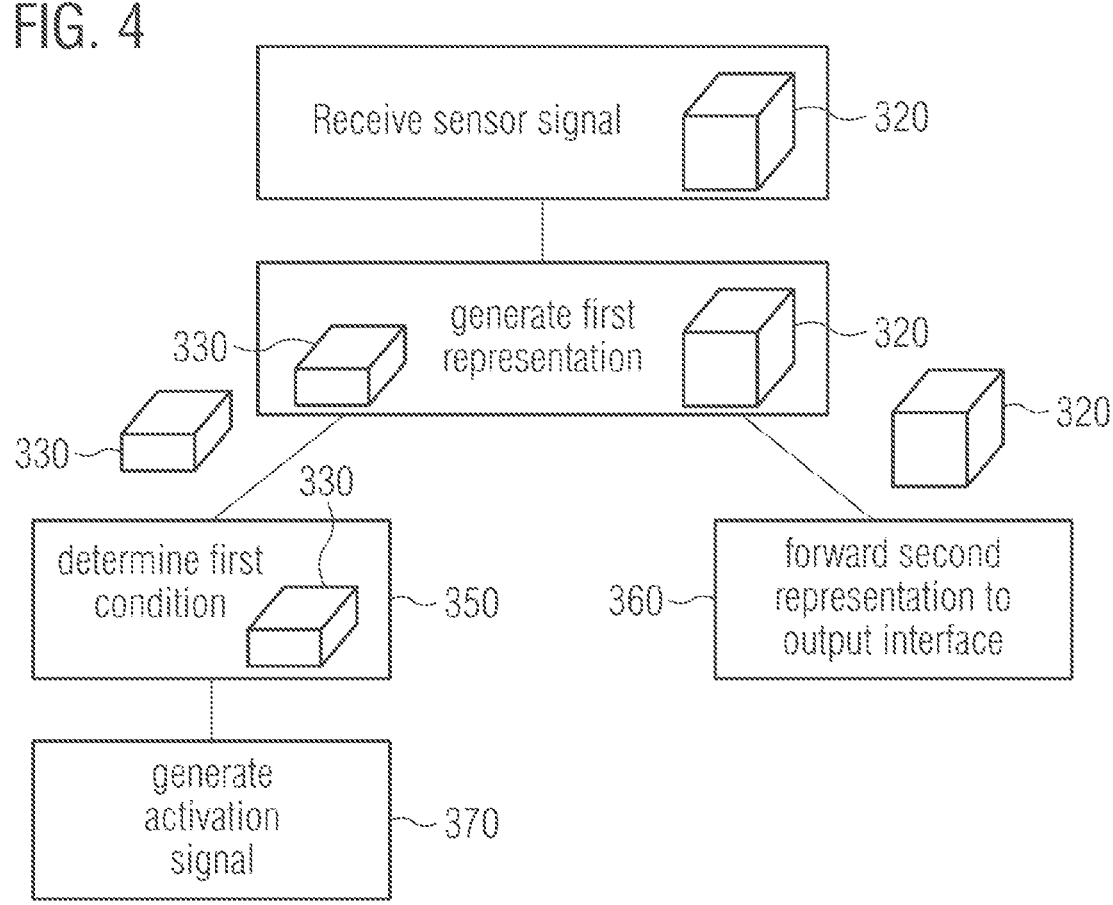
FIG. 4 illustrates a flow chart of the processing within an embodiment of an Electronic control unit, a gateway circuit, or an environmental sensor element.

FIG. 4 illustrates a flowchart of an example for a method of data reduction and forwarding within an embodiment of an Electrical Control Unit. Data reduction is performed based on a radar data cube as illustrated in FIG. 3, which is received as a high-resolution sensor signal 320, also referred to as high-resolution representation 320 or as the second representation of the sensor signal. The high-resolution representation 320 is processed to generate the first representation of the sensor signal 330 with a lower resolution, also referred to as low resolution representation 330. Just as an example, it is assumed that only the range (indicated as distance 302 in FIG. 3) is covered by the high-resolution sensor signal 320 is reduced indicated by the schematically illustrated low resolution radar data cube 330 which has a reduced extension in the 3rd dimension 302 (best seen in FIG. 3). The first condition causing the generation of an activation signal within an embodiment of an Electrical Control Unit is determined based on the low-resolution representation 330 as illustrated by means of functional block 350. If the first condition is determined, the activation signal is generated in step 370.

Optionally the high-resolution representation 320 of the sensor signal is output or forwarded in step 360 as the second representation of the sensor signal for further processing by, for example, an autonomous drive ECU.

Figure 5:
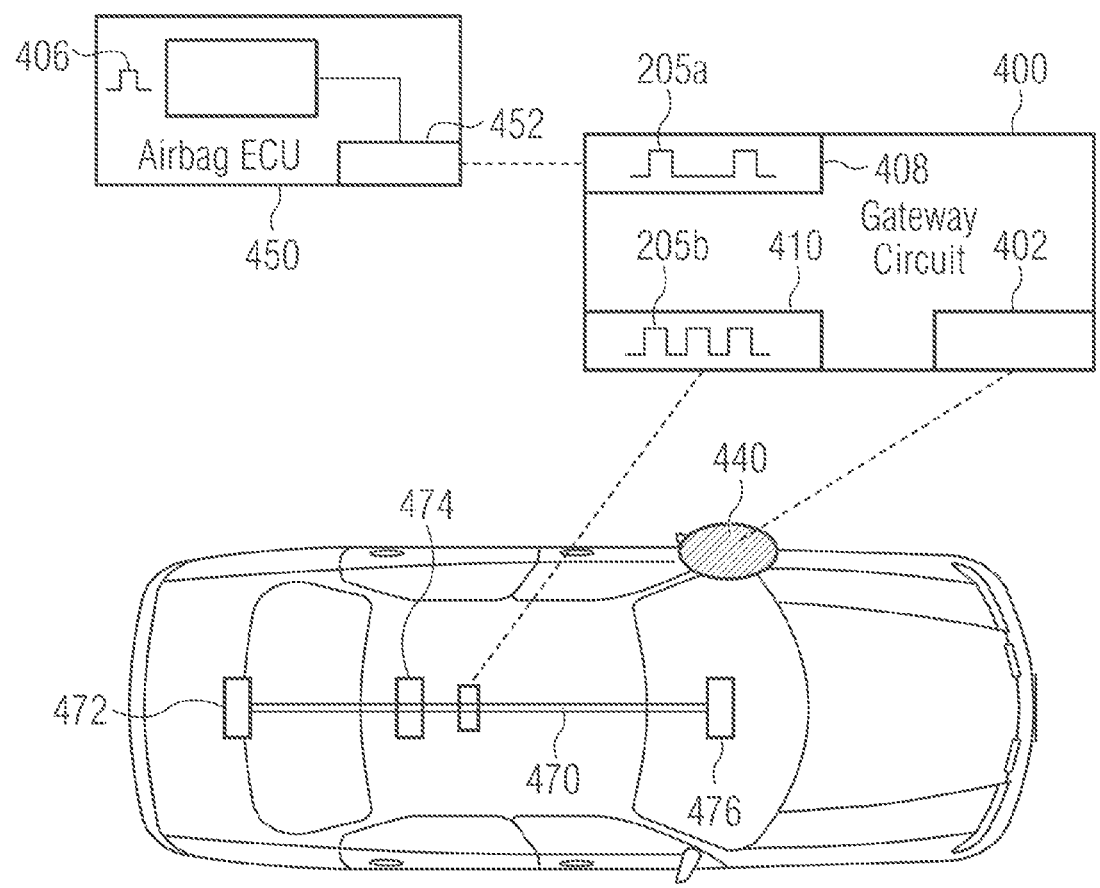
FIG. 5 illustrates an embodiment of a gateway circuit for an environmental sensor.

FIG. 5 illustrates an embodiment of a gateway circuit 400 couplable to an airbag Electronic Control Unit 450 having an input interface 452 for a sensor signal. The gateway circuit 400 enables the use of an airbag electronic control unit 450 based on sensor signals of environmental sensors, such as for example a radar sensor, a lidar sensor, or a camera sensor. The gateway circuit 400 comprises a signal input 402 configured to receive a sensor signal from the environmental sensor 440 of a vehicle. A first signal output 408 is configured to forward a first representation of the sensor signal 205a of the environmental sensor 440 to the airbag ECU 450. A second signal output 410 is configured to forward a second representation 205b of the sensor signal of the environmental sensor 440 to a physical layer of a communication system 470. The communication system 470 is schematically illustrated as a bus system of the vehicle in FIG. 5. The communication system 470 may have further Electronic Control Units 472, 474 and 476 attached thereto so that these may further use the second representation 205b of the sensor signal, while the airbag Electronic Control Unit 450 is enabled to process the first representation of the sensor signal 205a. Using a gateway circuit 400 may enable deliberately connect to the same sensor and to the same sensor interface to the airbag electronic control unit 450 together with further electronic control units 472, 474, and 476. Using the gateway provides different types of environmental sensor data to different applications. According to some embodiments, the gateway circuit 400 is configured to provide the second representation of the sensor signal 205b according to a protocol usable within the communication system 470 so as to forward the second representation 205b to the further electronic control units 472, 474, and 476 without having to modify them.

Using a gateway circuit 400 may reduce revalidation costs for the software of the airbag ECU due to a software change within the autonomous drive ECU can be saved which would otherwise arise if the autonomous drive ECU would receive the sensor signals first. This is because whenever a modification in an airbag system occurs, it is to be proven that the software of the airbag ECU is fault-free. If the autonomous drive ECU received the sensor signals first and a software change within the autonomous drive ECU was performed, a modification of the sensor signals might potentially be caused by the changed software. Consequently, every change within the autonomous drive ECU would require a revalidation of the fault free functionality of the airbag ECU. Using a gateway circuit 400, instead, enables to deliberately change the software within the autonomous drive ECU without automatically necessitating a revalidation of the airbag ECU.

The forwarding of the first representation of the sensor signal 205a and of the second representation of the sensor signal 205b may be achieved according to several alternatives within the gateway circuit 400.

According to some embodiments, the gateway circuit 400 is configured to receive both representations of the sensor signals as sensor telegrams over a communication bus. It will be appreciated that a complete first representation 205a or a complete second representation 205b will typically require more than one telegram for transmission over the communication bus. So an individual sensor telegram may comprise portions of first or second representation 205a, 205b. It may be of interest for portions of the first representation of the sensor signal 205a within a sensor telegram to be labeled using a first tag. Likewise portions of a second representation 205b of the sensor signal within a sensor telegram may be labeled using a second tag.

An embodiment of environmental sensor to generate sensor telegrams for transmission over the bus is illustrated in FIG. 8 and will be described subsequently.

When receiving sensor signal representations 205a, 205b implemented as sensor telegrams, the gateway circuit 400 identifies whether a received sensor telegram comprises at least a portion of a first representation of the sensor signal 205a or at least a portion of the second representation of the sensor signal 205b based on the tag within an individual sensor telegram. This may allow for an efficient hardware implementation of the gateway circuit in systems where the sensor signal is created having a series of sensor telegrams since the gateway circuit only needs to be capable of identifying the tags within the sensor telegram to appropriately direct the content of the sensor telegram to the first signal output or to the second signal output, respectively. More precisely, in such a setup the gateway could be implemented rather simple, as there is no intelligence required to analyze the actual portion of the sensor signal representation within the telegram.

If, for example, the CAN bus is used to transport the sensor signal, the CAN messages of the sensors may have identical ID's—an example of tags in the terminology of the above description—when comprising at least a portion pertaining to a single representation of the sensor signal. Alternatively, the CAN messages may have two different IDs when comprising at least a portion of the first representation of the sensor signal and at least a portion the second representation of the sensor signal. For clarity one sensor telegram would then comprise both high- and low-resolution portions within one sensor telegram. In this event, CAN messages with the different IDs may be sent in any sequence as a series of sensor telegrams.

According to further embodiments, the gateway circuit 400 may be configured to receive the second representation of the sensor signal 205b via the signal input 402 and to internally derive the first representation of the sensor signal 205a, for example as elaborated on in connection with FIG. 3.

According to further embodiments of the gateway circuit 400, the gateway circuit is further configured to determine the first condition based on the first representation of the sensor signal 205a to further implement the functionality to cause safety measures as discussed for the Electronic Control Unit 200 of FIG. 2. In such a setup the first condition could be forwarded to an ECU with less bus traffic, as it may be sufficient to only transport the signaling of the first condition on the bus. Such a setup of the gateway circuit 400 will require more intelligence at the gateway circuit 400 while workload to identify the first condition is lifted from the ECU. It is further conceivable that the gateway circuit 400 signals the determination of the first condition to an autonomous driving ECU in order to be taken into account by the autonomous driving system, too.

Figure 6:
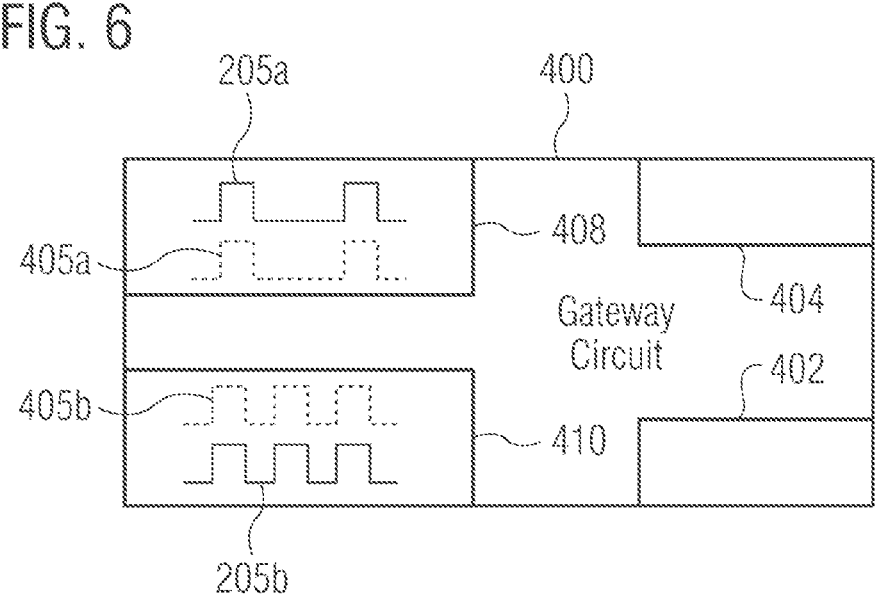
FIG. 6 illustrates a further embodiment of a gateway circuit for at least two environmental sensors.

Further embodiments of a gateway circuit 400 serve as a gateway for multiple associated environmental sensors. An embodiment of such a gateway circuit is illustrated in FIG. 6. As compared to the gateway circuit of FIG. 5, the gateway circuit 400 further comprises a second signal input 404 configured to receive a further sensor signal from a second environmental sensor of the vehicle. Further, the first signal output 408 of the gateway circuit 400 is configured to forward a first representation of the further sensor signal 405a to the airbag ECU. Similarly, the second signal output 410 is configured to forward a second representation of the further sensor signal 405b to the physical layer of the communication system. Further embodiments may be designed to simultaneously serve as a gateway for an arbitrary number of environmental sensors.

Figure 7:
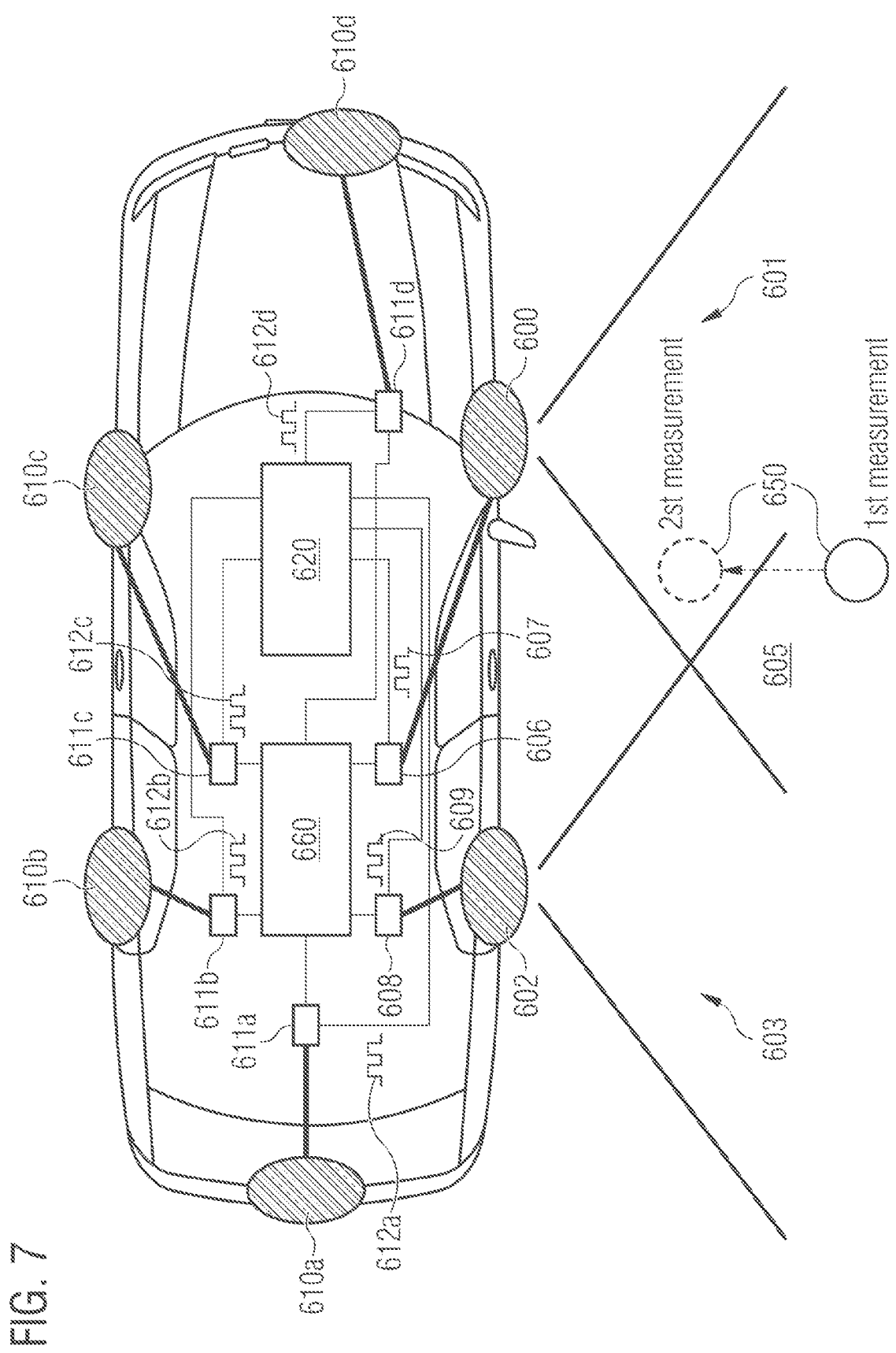
FIG. 7 illustrates an embodiment of a vehicle safety system.

FIG. 7 schematically illustrates an example of a safety system for a vehicle in which autonomous driving functionalities are also present and controlled by central ECU 660. In autonomous driving, the central ECU 660, for example, decides as to whether to change a steering angle or a speed of the vehicle. To this end, the resolution of the sensor data may need to be sufficient to create a model of the environment which is accurate enough to avoid a collision with other vehicles or environmental objects and to decide on good driving commands for passenger comfort and for energy efficiency. Autonomous drive systems generally rely on multiple sensors to create a model of the environment of the vehicle to be able to guide or drive the vehicle without or with hardly any human interaction. Depending on the implementation, autonomous driving functionalities may be restricted to some scenarios, e.g. to highway traffic, while it may not be fully available in others, e.g. in city traffic. Nonetheless, while the high-resolution output of the environmental sensors may not be permanently used for autonomous driving, a first representation of the sensor signals having a lower resolution may be continuously available as an input to the airbag ECU 620 so as to enable the airbag ECU 620 to also use environmental data although it might have a lower processing power than the central ECU 660 for autonomous driving functions. While the high-resolution output of the environmental sensors may not be used for autonomous driving functions, the output of the environmental sensor may nonetheless be updated, e.g. more than 1 time per second, as an input to the airbag ECU.

The safety system comprises a first environmental sensor 600 providing first sensor signals and a second environmental sensor 602 providing second sensor signals. In a setting supporting autonomous drive functions, it is desirable that the full environment of the vehicle is observed, so that a first field of view 601 of the first environmental sensor 600 and a second field of view 603 of the neighbored second environmental sensor 602 are at least partially overlapping, resulting in an overlapping field of view 605. The sensors are preferably implemented such that the first sensor signal and the second sensor signal are loosely coupled. Loosely coupling the sensors may not require perfect synchronization of the coupled sensors. The use of embodiments of airbag ECUs together with environmental sensors allows using information of at least two environmental sensors together to determine conditions that give rise to safety measures which have not been accessible by conventional approaches, as will be explained next. It is to be understood that the use of two environmental sensors together, however may bring about some constraints with respect to the loose coupling between the environmental sensors. A synchronization between the two sensors should be good enough that an object 650 determined by the first sensor 600 within the overlapping field of view 605 can—without ambiguity—also be identified by the second sensor 602 within the overlapping field of view 605. Further, the coupling should be good enough to allow determining the conditions sought for within the particular implementation. For example, if the presence of an object 650 shall be determined with a time resolution of 1 ms, it appears to be appropriate to loosely couple the environmental sensors such that they are synchronized to one another with an uncertainty of less than 1 ms. Similar considerations apply for the accuracy the relative position between the contributing sensors. When mounted to a vehicle the relative position of the sensors is typically fix and known. One may, understand loosely coupling the sensors as having the so coupled sensors timely and spatially aligned with sufficient precision to be able to determine the first condition and further conditions of interest. In other words, the time synchronization between two loosely coupled environmental sensors should be such that detections of objects visible to both sensors (e.g. FFT peaks and objects as discussed with respect to FIG. 3) do not need to be time compensated between individual environmental sensors before being used by postprocessing software within, e.g. an airbag ECU or an automated drive ECU. Time compensation is the method used to compensate the object movement between a reference time and the time its characteristics were measured (range, angle, Doppler). The loosely coupled approach allows not only to save computation time by avoiding computations related to the compensation but also by avoiding a resultant increased inaccuracy in the mathematic representation of the detections (range, angle, Doppler-velocity, estimate of non-Doppler velocity).

In order to support autonomous drive functions, further sensors 610a to 610d are illustrated in FIG. 7. The sensors 610a to 610d together with first sensor 600 and second sensor 602 should be designed and configured to provide full coverage of the vehicles environment. The subsequent disclosure of the safety system, however, will focus on neighboring sensors 600 and 602 which appear sufficient to elaborate on some new capabilities of an embodiment of an airbag ECU 620 when employed in a setup using environmental sensors.

In order to make additional use of loosely coupled sensors 600 and 602, a first gateway circuit 606 comprises a first signal output configured to generate a first representation of the first sensor signal 607 and a second signal output configured to forward a second representation of the first sensor signal to a physical layer of a communication system. The communication system forwards the second representation of the first sensor signal to the central ECU 660. Likewise, a second gateway circuit 608 comprises a first signal output configured to generate a first representation of the second sensor signal 609 and a second signal output configured to forward a second representation of the second sensor signal to the physical layer via the communication system to the central ECU 660. The airbag ECU 620 is coupled to the first signal outputs of the first gateway circuit 606 and the second gateway circuit 608, respectively. Via associated gateway circuits 611a, . . . , 611d, the first representations of the sensor signals 612a, . . . , 612d of the remaining environmental sensors 610a, . . . , 610d is forwarded to the airbag ECU 620 while the second representation of the sensor signals of the remaining environmental sensors 610a, . . . , 610d are forwarded to the central ECU 660. The airbag ECU 620 is configured to identify a first condition indicating a potential impact of an object to the vehicle based on the first representation of the first sensor signal, the first representation of the second sensor signal, or a combination of the first representation of the first sensor signal and the first representation of the second sensor signal. In the event that such a condition was determined, the airbag ECU 620 is further configured to generate an activation signal to cause a safety measure to protect the passengers of the vehicle. In further embodiments, a single gateway circuit capable to serve all environmental sensors 600, 602, and 610a to 610d may be used, similar to the gateway circuit illustrated in FIG. 6. Further embodiments may integrate one or all of the gateway circuits within the airbag ECU 620 or within the central ECU 660.

FIG. 7 illustrates one particular example of a condition that may be determined to cause the execution of safety measures. In particular, the condition illustrated is the upcoming side impact of an object 650, which may be determined early enough to effectively fire side airbags and to furthermore even cause additional reversible safety measures to protect the passengers. Solid lines in FIG. 7 extending from the first sensor 600 indicate the first sensor's field of view 601. Solid lines extending from the second sensor 602 indicate the second sensor's field of view 603. It will be noted that both sensors 600, 602 have an overlapping, common field of view 605.

Now, suppose the object 650 is determined in the overlapping field of view 605 in a first measurement by both of the loosely coupled environmental sensors 600 and 602. In a subsequent, second measurement, however, the object is only detected by one of the two sensors, say within the field of view 601 of the first environmental sensor 600 in its field of view 601. As indicated by a dashed arrow the object 650 has moved from the first position of the first measurement to the second position—indicated as a circle drawn in a broken line at the point in time of the second measurement.

This sequence of measurement results allows the airbag ECU to determine that the object 650 moves towards the side of the vehicle without requiring high computational effort to come to this conclusion. This may, for example, allow determining the condition that an impact of the object 650 is to be expected, with a smaller latency as compared to an approach relying on tracking the object's 650 trajectory based on the individual sensor signals of first and second sensor 600, 602 as would be an approach used by an autonomous driving system performed by say the central ECU 660.

In other words, the first representation of the first sensor signal and the first representation of the second sensor signal may provide an estimate for a direction of movement of an object 650 within the partially overlapping field of view 605 which can be used to cause safety measures in an embodiment of a safety system as illustrated in FIG. 7. In particular, a respective first condition indicating a side impact may be identified based on a moving object 650 identified in one of the first representation of the first sensor signal 607 and the first representation of the second sensor signal 609, after the object was before detectable within the first representation of the first sensor signal 607 and the first representation of the second sensor signal 609. Similar considerations may apply for predicting the time of the impact, by, for example, extrapolating the change of position between the two measurements into the future.

FIG. 8 schematically illustrates an embodiment of an environmental sensor element 700 for a vehicle. The environmental sensor element 700 is capable of providing a first representation of a sensor signal 205a as well as a second representation of the sensor signal 205b. The sensor element 700 comprises a radar sensor or a lidar sensor as a sensor 702. The sensor 700 provides a sensor signal covering a limited field of view 704, essentially defined by an opening angle θ. The opening angle θ may be an angle in a plane or a solid angle. The environmental sensor element 700 may be configured to provide the first representation of the sensor signal 205a as well as the second representation of the sensor signal 205b. To this end, the sensor element 700 may, for example, comprise a CPU or any other type of logic circuit (not shown in FIG. 7) to generate the first and second representations or to convert the first representation into the second representation. The environmental sensor element 700 further comprises an interface 706 couplable to a physical layer of a communication system. The interface is configured to output the first representation of the sensor signal 205a, the second representation of the sensor signal 205b, or both the first the representation of the sensor signal 205a, and the second representation of the sensor signal 205b to the physical layer in order to provide different representations of the sensor signal for an ECU as well as for other components within the system. According to some examples, the environmental sensor element 700 may be configurable to output one of the three alternatives. If the environmental sensor element 700 is configurable, it may be used for different vehicle architectures or different configurations of the same vehicle type can be easily implemented. Depending on the configuration, the environmental sensor element 700 may be used as an input for an airbag ECU, for an autonomous drive ECU, or for both ECU's at a time. Hence, and the use of a distinguished ECU for each configuration may be avoided.

According to some embodiments, the environmental sensor element 700 has an interface that is configured to output the representations of the sensor signals using one more or sensor telegrams. In order to enable the subsequent components to identify the different representations without a major analysis effort, the interface of the environmental sensor element may insert a specific tag into individual sensor telegrams that indicates whether the individual sensor telegram carries the first representation of the sensor signal 205a or the second representation of the sensor signal 205b. The tags inserted or used to distinguish the different representations may correspond to the tags discussed in connection with the gateway circuit 400 of FIG. 5.

The aspects and features mentioned and described together with one or more of the previously detailed embodiments and figures, may as well be combined with one or more of the other embodiments in order to replace a like feature of the other embodiment or in order to additionally introduce the feature to the other embodiment.

The description and drawings merely illustrate the principles of the disclosure. Furthermore, all embodiments recited herein are principally intended expressly to be only for pedagogical purposes to aid the reader in understanding the principles of the disclosure and the concepts contributed by the inventor(s) to furthering the art. All statements herein reciting principles, aspects, and embodiments of the disclosure, as well as specific embodiments thereof, are intended to encompass equivalents thereof.

Functions of various elements shown in the previous figures, including any functional blocks labeled as "means", "means for providing a sensor signal", "means for generating a transmit signal.", "ECU" etc., may be implemented in the form of dedicated hardware, such as "a signal provider", "a signal processing unit", "a processor", "a controller", etc. as well as hardware capable of executing software in association with appropriate software. When provided by a processor, the functions may be provided by a single dedicated processor, by a single shared processor, or by a plurality of individual processors, some of which or all of which may be shared. However, the term "processor" or "controller" is by far not limited to hardware exclusively capable of executing software, but may include digital signal processor (DSP) hardware, network processor, application specific integrated circuit (ASIC), field programmable gate array (FPGA), read only memory (ROM) for storing software, random access memory (RAM), and non-volatile storage. Other hardware, conventional and/or custom, may also be included.

The following claims are hereby incorporated into the detailed description, where each claim may stand on its own as a separate embodiment. While each claim may stand on its own as a separate embodiment, it is to be noted that— although a dependent claim may refer in the claims to a specific combination with one or more other claims—other embodiments may also include a combination of the dependent claim with the subject matter of each other dependent or independent claim. Such combinations are explicitly proposed herein unless it is stated that a specific combination is not intended. Furthermore, it is intended to include also features of a claim to any other independent claim even if this claim is not directly made dependent to the independent claim.

What is claimed is:

1. A safety system for a vehicle, the safety system comprising:
    a first environmental sensor configured to provide a first sensor signal;
    a second environmental sensor configured to provide a second sensor signal, wherein the first sensor signal and the second sensor signal are loosely coupled and a field of view for the first environmental sensor and the second environmental sensor are at least partially overlapping;
    a first gateway circuit comprising a first signal output configured to generate a first representation of the first sensor signal, and a second signal output configured to forward a second representation of the first sensor signal to a physical layer of a communication system;
    a second gateway circuit comprising a first signal output configured to generate a first representation of the second sensor signal, and a second signal output configured to forward a second representation of the second sensor signal to the physical layer of the communication system; and
    an electronic control unit configured to identify a first condition based on the first representation of the first sensor signal, the first representation of the second sensor signal, or a combination of the first representation of the first sensor signal and the first representation of the second sensor signal, wherein the electronic control unit is further configured to generate an activation signal in response to the first condition.

2. The safety system according to claim 1, wherein the activation signal is at least one selected from:
    a reversible activating signal for activating a reversible safety measure, or
    an irreversible activating signal for activating an irreversible safety measure.

3. The safety system according to claim 2, wherein the reversible activating signal is configured to cause at least one of:
    closing at least one window of the vehicle,
    closing at least one roof portion of the vehicle,
    tensioning at least one seat belt of the vehicle,
    adjusting at least one seat of the vehicle, or
    suppressing an emergency braking of a vehicle.

4. The safety system according to claim 2, wherein the irreversible activating signal is configured to cause at least one selected from:
    an emergency breaking of the vehicle, or
    a firing of an airbag.

5. The safety system according to claim 1, wherein the combination of the first representation of the first sensor signal and the first representation of the second sensor signal provides an estimate for a direction of movement for an object within the partially overlapping fields of view.

6. The safety system according to claim 1, wherein the first condition is identified based on a moving object identified in one of the first representation of the first sensor signal and the first representation of the second sensor signal,
   after the moving object was detectable within the first representation of the first sensor signal and the first representation of the second sensor signal.

7. The safety system according to claim 1, wherein the first environmental sensor and the second environmental sensor are implemented as radar sensors, lidar sensors, or camera sensors.

8. The safety system according to claim 1, further comprising an autonomous driving electronic control unit configured to receive the second representation of the first sensor signal, the second representation of the second sensor signal, or a combination of the second representation of the first sensor signal and the second sensor signal.

9. The safety system according to claim 1, wherein:
   the first gateway circuit is configured to generate the first representation of the first sensor signal from the second representation of the first sensor signal; and
   the second gateway circuit is configured to generate the first representation of the second sensor signal from the second representation of the second sensor signal.

10. The safety system according to claim 1, wherein:
   the second representation of the first sensor signal has a higher resolution than the first representation of the first sensor signal for a first given instant of sensor data in terms of at least one of angular resolution, spatial range covered, or relative velocity; and
   the second representation of the second sensor signal has a higher resolution than the first representation of the second sensor signal for a second given instant of sensor data in terms of at least one of angular resolution, spatial range covered, or relative velocity.

11. The safety system according to claim 1, wherein the activation signal is configured to cause a change in a physical operation or a physical state of the vehicle.

12. An automotive system comprising:
   a plurality of sensor sub-systems, each sensor sub-system of the plurality of sensor sub-systems comprising a sensor coupled to a respective gateway circuit, the respective gateway circuit configured to generate a first representation of a sensor signal provided by the sensor and provide a second representation of the sensor signal to a physical layer of a communication system, wherein the second representation of the sensor signal has a higher resolution than the first representation of the sensor signal; and
   an electronic control unit configured to identify a first condition based on the first representation of the sensor signal from at least one of the plurality of sensor sub-systems,
   wherein the electronic control unit is further configured to generate an activation signal in response to the first condition, wherein the activation signal is configured to cause a change in a physical operation or a physical state of a vehicle.

13. The automotive system of claim 12, further comprising an autonomous drive electronic control system coupled to the communication system and configured to receive the second representation of the sensor signal from at least one of the plurality of sensor sub-systems.

14. The automotive system of claim 12, wherein at least two sensors of the plurality of sensor sub-systems have an overlapping field of view.

15. The automotive system of claim 14, wherein the at least two sensors of the plurality of sensor sub-systems comprise radar sensors, lidar sensors, or camera sensors.

16. The automotive system of claim 12, wherein the activation signal is configured to cause a deployment of an airbag.

17. The automotive system of claim 12, wherein the second representation of the sensor signal has the higher resolution than the first representation of the sensor signal for a given instant of sensor data in terms of at least one of angular resolution, spatial range covered, or relative velocity.

18. A method, comprising:
   providing a first sensor signal by a first environmental sensor;
   providing a second sensor signal by a second environmental sensor, wherein the first sensor signal and the second sensor signal are loosely coupled and a field of view for the first environmental sensor and the second environmental sensor are at least partially overlapping;
   generating a first representation of the first sensor signal and a second representation of the first sensor signal by a first gateway circuit;
   forwarding the second representation of the first sensor signal to a physical layer of a communication system;
   generating a first representation of the second sensor signal and a second representation of the second sensor signal by a second gateway circuit;
   forwarding the second representation of the second sensor signal to the physical layer of the communication system;
   identifying, by an electronic control unit, a first condition based on the first representation of the first sensor signal, the first representation of the second sensor signal, or a combination of the first representation of the first sensor signal and the first representation of the second sensor signal; and
   generating, by the electronic control unit, an activation signal in response to the first condition.

19. The method of claim 18, further comprising deploying an airbag in response to the activation signal.

20. The method of claim 18, wherein:
   the second representation of the first sensor signal has a higher resolution than the first representation of the first sensor signal for a first given instant of sensor data in terms of at least one of angular resolution, spatial range covered, or relative velocity; and
   the second representation of the second sensor signal has a higher resolution than the first representation of the second sensor signal for a second given instant of sensor data in terms of at least one of angular resolution, spatial range covered, or relative velocity.

* * * * *

UNITED STATES PATENT AND TRADEMARK OFFICE
CERTIFICATE OF CORRECTION

PATENT NO. : 12,337,854 B2  
APPLICATION NO. : 17/822957  
DATED : June 24, 2025  
INVENTOR(S) : Roger et al.

Page 1 of 1

It is certified that error appears in the above-identified patent and that said Letters Patent is hereby corrected as shown below:

In the Claims

In Column 18, Line 55, Claim 3:  
Change "suppressing an emergency braking of a vehicle."  
To --suppressing an emergency braking of the vehicle.--

In Column 18, Line 59, Claim 4:  
Change "an emergency breaking of the vehicle"  
To --an emergency braking of the vehicle--

Signed and Sealed this  
Sixteenth Day of September, 2025

Coke Morgan Stewart  
*Acting Director of the United States Patent and Trademark Office*